United States Patent [19]

Grüdelbach

[11] 4,086,526

[45] Apr. 25, 1978

[54] METHOD OF AND A POWER SWITCHING DEVICE FOR REGULATING THE ELECTRICAL POWER DELIVERED TO A CONSUMER IN AN A.C. NETWORK

[75] Inventor: Hans-Dieter Grüdelbach, Plon, Germany

[73] Assignee: Poul Hahn Evers, Pura, Switzerland

[21] Appl. No.: 773,279

[22] Filed: Mar. 1, 1977

[30] Foreign Application Priority Data

Sep. 9, 1976 Switzerland ............... 11447/76

[51] Int. Cl.$^2$ ............................................. G05F 1/44
[52] U.S. Cl. ........................................ 323/34; 323/23; 307/112
[58] Field of Search ............... 307/112, 252 R, 305, 307/322 SC, 252 T, 254, 262; 323/22 T, 23, 34, 75 E, 40

[56] References Cited

U.S. PATENT DOCUMENTS

| | | | |
|---|---|---|---|
| 3,525,882 | 8/1970 | Montague | 307/252 R |
| 3,693,069 | 9/1972 | Kelley | 323/34 |
| 3,793,581 | 2/1974 | Ortgies | 323/34 |

FOREIGN PATENT DOCUMENTS

| | | |
|---|---|---|
| 1,085,967 | 1/1961 | Germany. |
| 1,047,904 | 3/1965 | United Kingdom. |

Primary Examiner—L. T. Hix
Assistant Examiner—Stafford D. Schreyer
Attorney, Agent, or Firm—Browdy and Neimark

[57] ABSTRACT

A method of regulating electrical power supplied via a current path to a consumer in an A.C. network involves setting a desired current flow angle using a power switching device connected in the current path to the consumer. The method includes cutting the switching device ON at the beginning of each half-wave of the line voltage substantially at a phase angle of zero degrees, and cutting the power switching device off at a phase angle corresponding to the desired current flow angle. A power switching device for carrying out the method includes at least one set of two transistors having their respective collector-emitter leads connected in parallel to define a current path. Rectifier means are provided in series with the consuming means and the transistors. Secondary winding means of transformer means are connected in respective base-emitter circuits of the transistors, while primary winding means of the transformer means are connected to a source of switching voltages which drive the transistors. The primary winding means are connected to a source of driving voltage which provide gating ON pulses to the two transistors out of phase but overlapping. The driving voltage includes OFF pulses which include a portion whose polarity is opposite to that of the gating ON pulses.

9 Claims, 5 Drawing Figures

METHOD OF AND A POWER SWITCHING DEVICE FOR REGULATING THE ELECTRICAL POWER DELIVERED TO A CONSUMER IN AN A.C. NETWORK

BACKGROUND OF THE INVENTION

The present application relates to a method of and apparatus for regulating the electrical power supplied to a consumer (utilization device) in an A.C. network by establishing the current flow angle using a power switching device connected in the path of the current to the consumer.

It is known to accomplish power regulation of the type described above by the simple means of phase angle control, as it is known, using thyristors or triacs as power switching devices. In this system, the consumer is connected to the A.C. line during each half-wave of the A.C. line voltage following the zero cross-over point and delayed by a phase angle such that the remaining phase angle of the half-wave until the next zero cross-over point corresponds to the desired current flow angle. Considerable peak load levels appear at the moment of connection, particularly in the case of capacitive consumers and especially when the consumer is connected to the A.C. line at a larger phase angle, i.e., with a relatively high instantaneous voltage in the line. These peak loads create an excessive burden on the line and also produce disadvantageous high-frequency interference in nearby high-frequency consumers, such as radio and television receivers or measuring devices for example, even when devices to eliminate the interference have been provided on the power switching device.

SUMMARY OF THE INVENTION

The principal object of the present invention is to provide a method of and apparatus for regulating electrical power supplied to a consumer which avoids the disadvantageous peak loads when a consumer (utilization device) is connected to the A.C. line during the half-waves of the A.C. line voltage, while also allowing free selection of the current flow angle during each half-wave.

According to the invention, the method of the type described hereinabove is characterized by the fact that the power switching device is cut in, in each case, at the beginning of a half-wave of the A.C. line voltage at least approximately at a phase angle of 0°, and disconnected at a phase angle which corresponds to the desired current flow angle.

Since the moment at which the power switching device is cut in, in the method according to the present invention, is located at least close to the zero cross-over point in the A.C. line voltage, a very slow current-change rate is effected when connecting the consumer to the A.C. line, so that disadvantageous peak loads which create a stress on the line and cause the emission of high-frequency interference no longer appear when the consumer is connected in accordance with the present invention. In addition, the development of disadvantageous peak loads is eliminated when the power switching device is disconnected according to the invention at a later point in time corresponding to the desired current flow angle prior to the next zero cross-over point of the A.C. line voltage.

Thyristors or similar switching devices can be used as power switching devices in the method according to the present invention. However, the use of conventional thyristors which can be made non-conducting as power switching devices at expected voltage levels presently requires that rectifiers be connected in series, since these thyristors do not possess sufficient blocking capability with reverse polarity. In addition, difficulties arise when the thyristors must be connected in parallel, because of the nature of the power which is to be switched. Another disadvantage of using thyristors as power switching devices in the method according to the present invention is that costly switching circuits are needed to produce the necessary cutoff pulses.

An advantageous preferred embodiment of the method according to the present invention consequently utilizes transistors as the power switching devices, whereby the load which develops is distributed over several transistors. The method according to this preferred embodiment includes, as a salient feature, using at least two transistors, connected in parallel and mutually decoupled, as the power switching device. This method includes connecting the collector-emitter leads of the transistors in the current path to the consumer, and is characterized further by the fact that the transistors are alternately connected at a switching frequency higher than the line frequency, as well as by the fact that the time segments of their ON states overlap, whereby the alternate switching-on of the transistors in each half period of the A.C. line voltage takes place from the beginning of the half period until the desired current flow angle is reached.

Each of the transistors is preferably driven by a transformer so that the driving power can be kept low.

Under these conditions, each transistor is advantageously driven by a driving voltage provided with gating pulses and gating pauses, the voltage being at least approximately a square wave voltage, and being supplied to the primary of each transformer, the driving voltage having a portion of its waveform, between gating pulses, whose polarity is opposite to that of the gating pulses in order to make the remanence of the transformer ineffective.

The present invention also relates to a power switching device for carrying out the method according to the invention and, in particular, the version of the method described hereinabove, according to which a plurality of transistors is used as a power switching device. The power switching device according to the present invention is characterized by the fact that at least one set of two transistors, with their collector-emitter leads connected in parallel, together with a set of rectifiers to supply the A.C. line voltage with the proper polarity, are connected in series with the consumer, and by the fact that the secondary winding of a corresponding transformer is connected to the base-emitter circuit of each transistor, the primary winding of the transformer being connected to a switching device to produce the driving voltage for the transistors.

A bridge rectifier can be provided to ensure bidirectional operation, one diagonal of the bridge rectifier being connected in series with the consumer and the set of two transistors connected in parallel being connected to the other diagonal.

A more efficient switching device can be realized by providing a set of two transistors connected in parallel and one rectifier connected in series with this set, in order to produce bidirectional operation in series with the consumer, whereby the directions of current flow effected by the set of transistors and the rectifier relative to the line or consumer connection side of the parallel circuit mentioned hereinabove is opposite in one branch of the parallel circuit to that in the other branch.

The present method and the present power switching device can be used advantageously for controlling any line-operated consumer, especially one with proportionally high capacitive quality or a pronounced reflective behavior, as well as reactive-load compensated consumers.

An important application of the method according to the invention consists in controlling the brightness of an electrical illuminating fixture. In particular, the method can be used advantageously for controlling fluorescent tubes as illuminating devices, with minimum interference with an existing installation and with simultaneous optimal compensation for the reactive power. Controlling the brightness of an electrical illuminating fixture is becoming increasingly important not only from the standpoint of conserving energy, but also from the standpoint of optimum and constant operating brightness when varying amounts of daylight are available.

A further application of the method according to the invention is to control power required for electric motors. In this connection, because it eliminates high peak loads, the method results in a reduction of the stress on the insulation inside the motor, caused by parasitic capacitances, in comparison with the use of the known phase angle regulation systems, in addition to reducing the bearing load caused by torque peaks.

Further applications for the method according to the invention can be found in which it is used advantageously for electrical igniting devices for combustion processes.

If known devices for phase angle control are provided in an A.C. line, the additional use of the method according to the invention or the installation of corresponding power switching devices in the same line will result in reduction of the load or a more uniform loading of the line. Known phase angle controls impose a load on the line primarily during the late phase angles of the A.C. line voltage, while the method according to the invention places a load on the line primarily during the early phase angles. Consequently, there is at least a partial balancing of the load imposed on one side of the line.

DETAILED DESCRIPTION OF THE PREFERRED EMBODIMENTS

Figure 1:
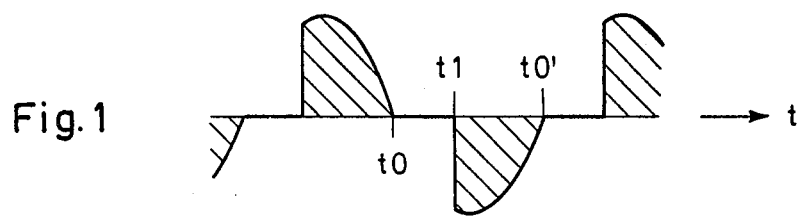
FIG. 1 is a graphical representation of current as a function of time in a consumer having conventional phase angle controls.

FIG. 1 shows current as a function of time, the current being regulated and flowing through a consumer (utilization device) with a conventional, known form of phase angle control, using a conventional controlled, known switching device. From the first zero cross-over point $t0$ to a later point in time $t1$, this power switching device remains blocked, i.e., no current flows. At point $t1$, the power switching device cuts in, i.e., the consumer is connected to the line, so that there is a sudden rise in the current with a rapid rate of current change, which causes the peak loads and high-frequency interference mentioned above. The current then continues flowing until the next zero cross-over point $t0'$.

Figure 2:
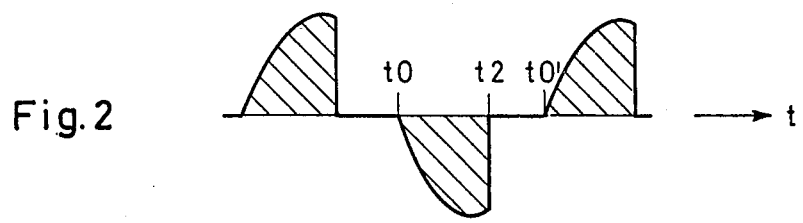
FIG. 2 is a graphical representation of current as a function of time in a consumer using the method according to the present invention.

FIG. 2 shows the current as a function of time with control, using the method according to the present invention. The corresponding, novel power switching device in this case is already cut in at time $t0$ of the first zero cross-over point so that the A.C. line current flows through the consumer as the A.C. voltage passes through the zero cross-over point, avoiding a sudden rise in current. At a later point in time $t2$, corresponding to the desired current flow angle, the power novel switching device is blocked, so that the current flowing through the consumer drops to zero until the power switching device cuts in again at the next zero cross-over point.

Figure 3:
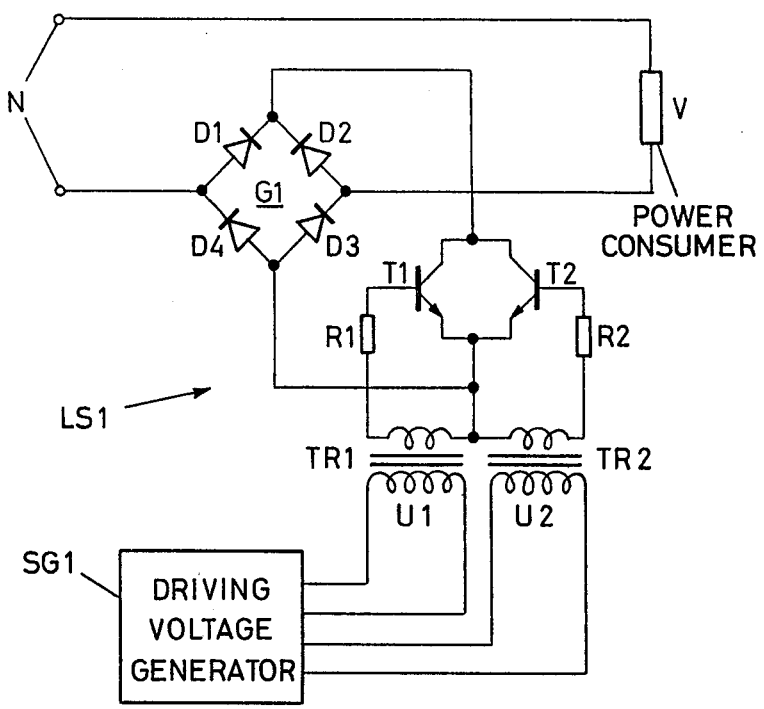
FIG. 3 is a schematic diagram of a first embodiment of a power switching device according to the present invention for carrying out the present invention in its apparatus aspect.

In the embodiment shown in FIG. 3, a load, consumer V is connected to a pair of terminals N of an A.C. line by a power switching device shown generally as LS1. The power switching device LS1 includes two transistors T1 and T2, connected in parallel and decoupled, with their collectors and emitters connected together. The connected collectors and emitters of the transistors T1 and T2 are connected to one of the diagonals of a bridge rectifier G1, the rectifier having a respective rectifier D1, D2, D3 and D4 in each branch, e.g., one or more diodes. The other diagonal of the bridge rectifier G1 is connected in series with the consumer V. The bridge rectifier G1 serves to protect the transistors T1, T2 against incorrect polarity and/or to allow bidirectional operation of the power switching device shown.

To drive the transistors T1 and T2, their bases are connected respectively, via current-limiting resistors R1 and R2, to one end of respective secondary windings of respective driver transformers TR1 and TR2. Driving voltages U1 and U2, described in more detail below, are fed to the respective primary windings of the respective transformers U1 and U2, with the primary windings connected to separate output terminals of a driving voltage generator SG1. Driving the transistors T1 and T2 by means of the transformers makes it possible to keep the required driving power low by providing impedance matching; it also allows the potentials of the bases of the two transistors T1 and T2 to be separated. Instead of using the two transistors T1 and T2, depending on the load, a larger number of transistors similarly connected in parallel can be provided.

In order to provide exact switching times for the transistors T1 and T2 on the one hand, thereby ensuring a precisely fixed current flow angle, and keeping the size of the driver transformers TR1 and TR2 small on the other hand, the driving voltage generator SG1 is designed so that it produces control signals at its output terminals whose frequency is much higher than the line frequency and is approximately 10 kHz for example. In addition, the control signals are preferably at least approximately of a square-wave type, whereby the control signals produced at the two output terminal pairs of the control signal generator SG1 are displaced in time relative to one another, but overlap.

Figure 4:
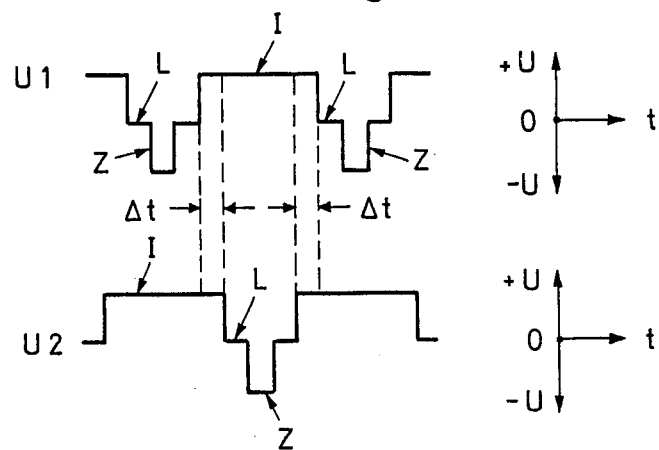
FIG. 4 is a waveform diagram showing the control voltages as a function of time for the power switching device of FIG. 3.

The driving voltages U1 and U2, preferably produced by the driving voltage generator SG1, are shown graphically in FIG. 4 as a function of time. The driving voltage U1 is a square-wave voltage with gating ON pulses I and gating OFF pulses L, in which the driving voltage drops to zero. Within the gating OFF pulses L, however, additional negative-going pulses Z are provided whose polarity is opposite to that of the gating ON pulses I. The driving voltage U2 has the same curve as a function of time as driving voltage U1, but is displaced in time relative to the latter, so that gating ON pulse I of driving voltage U2 occurs during the gating OFF pulse L of driving voltage U1. As can be seen from FIG. 4, the gating ON pulses I of driving voltages U1 and U2 overlap during times $\Delta t$.

The operation of the power switching device shown in FIG. 3, using signals voltages U1 and U2 according to FIG. 4, is set out in detail in the text below.

At the beginning of a half wave of the A.C. line voltage (phase angle of 0°), the driving voltage generator SG1 is triggered and delivers driving voltages U1 and U2 to the primary windings of the driver transformers TR1 and TR2. Then the driving voltage U1, particularly an ON pulse I, is fed to the transistor T1 via one of the transformers, e.g., transformer TR1, so that the transistor T1 conducts. Before the transformer TR1 begins to be saturated, the gating ON pulse I of driving voltage U2 appears at transformer TR2 and brings the transistor T2 to the conducting state, due to the overlap of the driving voltages U1 and U2 while the transistor T1 is still conducting, so that a continuous flow of current in the consumer V is ensured. The gating OFF pulse L in driving voltage U1 now blocks the transistor T1, while the additional negative-going pulse Z present within the gating OFF pulse L, with reverse polarity, eliminates the remenance magnetization in the transformer TR1 and thereby increases its current carrying capacity for the next current-conducting period of the transistor T1. This process is repeated alternately for the transistors T1 and T2, so that the load is uniformly distributed over the two transistors T1 and T2 which are involved, while the current flowing through the consumer V continuously assumes the pattern of the A.C. line voltage in the half wave in question. In order to produce the desired current flow angle, the driving voltage generator SG1 is then blocked at the corresponding phase angle of the half wave, so that the transistors T1 and T2 are no longer driven into the conducting state until the beginning of the next half wave. Diodes D1 and D4 of bridge rectifier G1 serve to provide the correct polarity depending on the changing signs of the half waves.

In one example, the pulse repetition rate of the driving voltages U1 and U2 was 10 kHz, the voltage of the gating ON pulses I was +10V, the voltage of the additional negative-going pulses Z was −10V, and the transformer ratio of the transformers TR1 and TR2 was 3:1. The driving voltages U1 and U2 can be produced and the desired current flow angle can be determined easily by known, conventional techniques and instrumentalities by suitably triggering and blocking the driving voltage generator SG1, especially with digital switching devices or other circuitry which indicates that desired phase angle.

Figure 5:
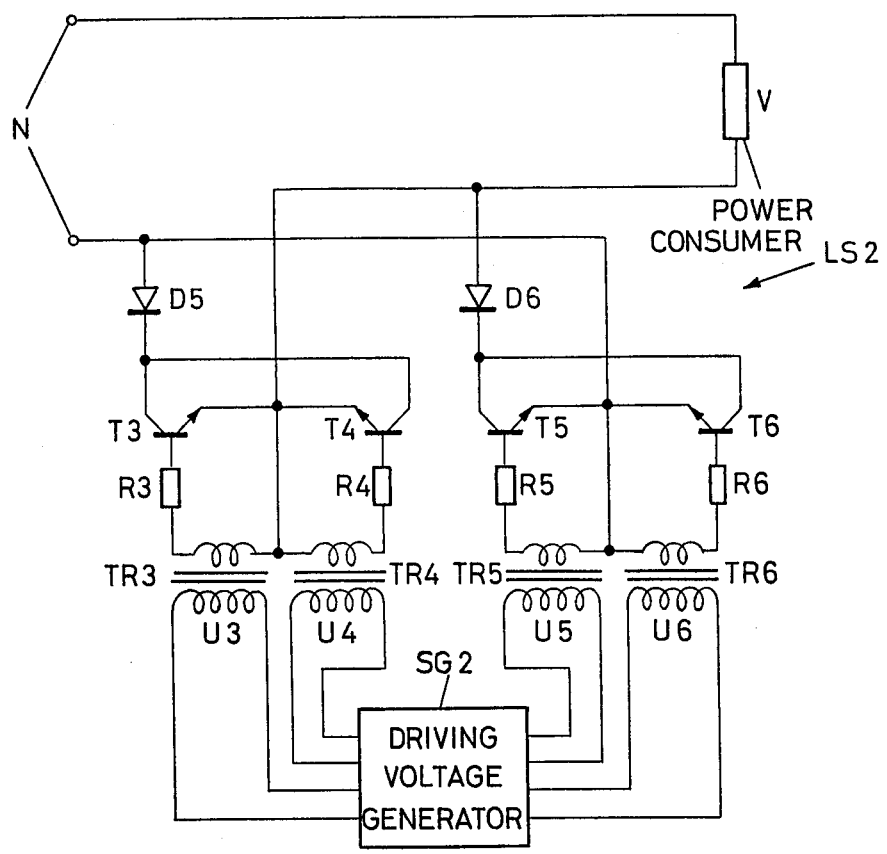
FIG. 5 is a schematic diagram of a second embodiment of a power switching device according to the present invention.

Another embodiment of the power switching device indicated broadly by the designation LS2 and which can switch higher currents and produces less heat loss, is shown in FIG. 5. In the power switching device LS2 shown in FIG. 5, two sets of transistors T3, T4 and T5, T6, decoupled and connected in parallel, are provided, driven respectively, as in the embodiment shown in FIG. 3, by respective individually connected driver transformers. In the embodiment of FIG. 5, four transformers TR3, TR4, TR5 and TR6 as well as respective current-limiting resistors R3, R4, R5, and R6 are provided. In order to ensure correct polarity for bidirectional operation, a respective rectifier D5 or D6, e.g., a diode, is respectively connected in series with the secondary windings of each pair of transformers TR3, TR4 and TR5, TR6 and respective bases of the transistors T3, T4 and T5, T6 are connected in parallel. These two series circuits are connected in parallel and are located in the path of the line current in series with the consumer V, whereby the current flow direction in each of the sets of two transistors T1, T2 and T3, T4 and the rectifiers D5 and D6 relative to the line or consumer-connection side of the parallel circuit described above, in one branch of the parallel circuit are opposite those in the other branch. The primary windings of the transformers TR3-TR6 are connected to corresponding output terminals of a driving voltage generator SG2 to provide corresponding driving voltages U3, U4, U5, and U6. The curve of the driving voltages U3 to U6 differs from that for driving voltages U1 and U2, as shown in FIG. 3, only in that the non-loaded sets of transistors TR3, TR4 and TR5, TR6 are not driven, as a function of the corresponding polarity of the A.C. line voltage.

In the embodiment shown in FIG. 5, the only heat losses are from the two rectifiers D3 and D4. In addition, the current load is distributed over the four transistors T3 to T6.

It is to be understood that the foregoing text and accompanying drawings relate to illustrative embodiments set out by way of example and not by way of limitation. It is to be appreciated that various other embodiments and numerous variants are possible without departing from the spirit and scope of the present invention, its scope being defined in the appended claims.

What is claimed is:

1. In a method of regulating electrical power supplied via a current path to at least one consumer in an A.C. network which involves setting desired current flow angle using a power switching device connected in the current path to the consumer, the improvement comprising providing as the switching device at least two transistors, connected in parallel and mutually decoupled, connecting collector-emitter leads of said transistors in the current path to the consumer, switching the transistors alternately at a switching frequency higher than the line frequency in such manner that the time intervals of their ON states overlap cutting the switching device ON at the beginning of each half wave of A.C. line voltage, at least approximately at a phase angle of 0°, and cutting the power switching device OFF at a phase angle corresponding to the desired current flow angle; whereby the alternate connection of the transistors takes place in each half period of the A.C. line voltage beginning at its start and lasting until the desired current flow angle is reached.

2. A method according to claim 1, including driving the transistors from transformer means.

3. A method according to claim 2, wherein said driving step comprises driving each transistor by a driving voltage having gating ON pulses and gating OFF pulses, said voltage being at least approximately a square-wave voltage, and said voltage having a portion within its gating OFF pulses whose polarity is opposite to that of the gating ON pulses, in order to make the remanence of the transformer ineffective.

4. A power switching device for regulating electric power delivered to at least one power consuming means in an A.C. network, the device comprising at least one set of two transistors having their respective collector-emitter leads connected in parallel to define a current path; rectifier means for providing A.C. line voltage with the correct polarity coupled in series with said consuming means and said transistors; secondary winding means of transformer means connected in respective base-emitter circuits of said transistors; and primary winding means of said transformer means connected to a source of switching voltages to produce driving voltage for the transistors.

5. A power switching device according to claim 4, wherein said rectifier means comprise a bridge rectifier having two diagonals provided to produce bidirectional operation, one diagonal of said bridge rectifier being connected in series with said power consuming means, said transistors having their respective collector-emitter leads connected to the other diagonal of said bridge rectifier.

6. A power switching device according to claim 4, wherein said at least one set of two transistors comprises two sets of two transistors connected in parallel and wherein said rectifier means comprise first and second rectifiers connected respectively in series with a respective one of said sets for providing bidirectional operation in series with the consumer, whereby current flow direction in the two sets of transistors and in the two rectifiers, relative to the line or consumer connection side of the parallel circuit in one branch of the parallel circuit is opposite to that in the other branch.

7. A power switching device according to claim 6, including consuming means, said consuming means being at least one electrical illuminating fixture.

8. A power switching device according to claim 6, wherein said source comprises a source of at least two substantially square-wave voltages displaced in phase with respective to one another and defining overlapping ON pulses.

9. A power switching device according to claim 4, wherein said source comprises a source of at least two substantially square-wave voltages displaced with respect to one another, defining overlapping ON pulses, with intervals between ON pulses defining OFF pulses, and respective pulses superimposed within each of the OFF pulses and having a polarity opposite said ON pulses.

* * * * *